United States Patent
Shaul et al.

(10) Patent No.: US 11,841,982 B2
(45) Date of Patent: Dec. 12, 2023

(54) PARTITIONING CIRCUITS FOR EXECUTION OF SEQUENTIAL SECURE COMPUTATION CODE ON MULTIPLE PROCESSORS

(71) Applicant: International Business Machines Corporation, Armonk, NY (US)

(72) Inventors: Hayim Shaul, Kfar Saba (IL); Ehud Aharoni, Kfar Saba (IL); Dov Murik, Haifa (IL); Omri Soceanu, Haifa (IL); Gilad Ezov, Nesher (IL); Lev Greenberg, Haifa (IL); Evgeny Shindin, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/505,964

(22) Filed: Oct. 20, 2021

(65) Prior Publication Data

US 2023/0119283 A1 Apr. 20, 2023

(51) Int. Cl.
*G06F 21/72* (2013.01)
*H04L 9/00* (2022.01)
*G06F 21/60* (2013.01)
*G06F 21/14* (2013.01)

(52) U.S. Cl.
CPC ............ *G06F 21/72* (2013.01); *G06F 21/602* (2013.01); *H04L 9/008* (2013.01); *G06F 21/14* (2013.01); *H04L 2209/125* (2013.01)

(58) Field of Classification Search
CPC .......................... G06F 21/70–72; H04L 9/008
See application file for complete search history.

(56) References Cited

U.S. PATENT DOCUMENTS

| | | | |
|---|---|---|---|
| 8,949,786 | B2 | 2/2015 | Vaidya et al. |
| 2014/0140514 | A1 | 5/2014 | Gentry |
| 2015/0229619 | A1* | 8/2015 | Costa ................... G06F 21/445 713/171 |
| 2017/0134158 | A1* | 5/2017 | Pasol .................... H04L 9/3066 |
| 2020/0076570 | A1* | 3/2020 | Musuvathi .............. G06F 21/72 |
| 2021/0350211 | A1* | 11/2021 | Dalli ....................... H04L 9/008 |
| 2022/0271914 | A1* | 8/2022 | Diallo .................... H04L 9/065 |

OTHER PUBLICATIONS

Hayward, R. et al., "Parallelizing fully homomorphic encryption for a cloud environment," 2014, Journal of Applied Research and Technology, 13 (2015), p. 245-252 (Year: 2014).*

Ankita Bhalla, "Various Ways of Parallelization of Sequential Programs", International Journal of Engineering Research & Technology (IJERT), ISSN: 2278-0181, vol. 3 Issue 1, Jan. 2014, pp. 3223-3228.

(Continued)

*Primary Examiner* — D'Arcy Winston Straub
(74) *Attorney, Agent, or Firm* — Barry D. Blount

(57) ABSTRACT

An example system includes a processor that can obtain a circuit describing operations of sequential secure computation code. The processor can modify the circuit based on a cost function. The processor can partition the circuit into a number of sub-circuits. The processor can assign the number of the sub-circuits to different processors for execution.

19 Claims, 7 Drawing Sheets

(56) References Cited

OTHER PUBLICATIONS

Buescher et al., "Faster Secure Computation through Automatic Parallelization", Proceedings of the 24th USENIX Security Symposium, Aug. 12-14, 2015, Washing, D.C., https://www.usenix.org/conference/usenixsecurity15/technical-sessions/presentation/buescher, pp. 531-546.
Ciesielski et al., "Verification of gate-level arithmetic circuits by function extraction", Jul. 2015, Uploaded Jan. 6, 2020, https://www.researchgate.net/publication/283796987_Verification_of_gate-level_arithmetic_circuits_by_function_extraction, 7 pages.
Demmler et al., "Automated Synthesis of Optimized Circuits for Secure Computation", CCS'15, Oct. 12-16, 2015, Denver, Colorado, https://dl.acm.org/doi/10.1145/2810103.2813678, 14 pages.
Hayward et al., "Parallelizing fully homomorphic encryption for a cloud environment", Journal of Applied Research and Technology, Universidad Nacional Autónoma de México, Centro de Ciencias Aplicadas y Desarrollo Tecnológico, Accepted Aug. 18, 2014, pp. 245-252.
Mell et al., "The NIST Definition of Cloud Computing", National Institute of Standards and Technology, U.S. Department of Commerce, Special Publication 800-145, 7 pages.
Patil et al., "Efficient Circuit Partitioning Algorithms For Parallel Logic Simulation", Proceedings of the Supercomputing Conference, Reno, NV, Nov. 1989, Uploaded Jul. 3, 2014, https://www.researchgate.net/publication/2691227_Efficient_Circuit_Partitioning_Algorithms_For_Parallel_Logic_Simulation, 11 pages.

* cited by examiner

200A

US 11,841,982 B2

PARTITIONING CIRCUITS FOR EXECUTION OF SEQUENTIAL SECURE COMPUTATION CODE ON MULTIPLE PROCESSORS

BACKGROUND

The present techniques relate to secure computation code. More specifically, the techniques relate to execution of sequential secure computation code, such as sequential fully homomorphic encryption (FHE) code.

Recent advancements in cryptography show how several parties can collaborate and compute a function on their secret inputs without disclosing their inputs. Specifically, cryptographers showed encryption schemes where arithmetic operations, such as addition and multiplication, can be applied on ciphertexts. The inputs of such an operation can be either a ciphertext encrypting an input value or a ciphertext which is the output of another operations. However, secure computation code, such as fully homomorphic encrypted (FHE) code, may be slow to execute. Since it may take a long time to run operations on ciphertexts, solutions utilize several processors to achieve better running times. However, in many cases, sequential programing languages may be used to describe a particular solution. Moreover, such sequential languages are hard to parallelize. In addition, manual parallelization costs time and money, is error prone, and may need to be performed for each deployment of each project.

SUMMARY

According to an embodiment described herein, a system can include processor to obtain a circuit describing operations of sequential secure computation code. The processor can also further modify the circuit based on a cost function. The processor can also partition the circuit into a number of sub-circuits. The processor can then assign the number of the sub-circuits to different processors for execution.

According to another embodiment described herein, a method can include obtaining, via a processor, a circuit describing operations of sequential fully homomorphic encryption (FHE) code. The method can further include modifying, via the processor, the circuit based on a cost function. The method can also further include partitioning, via the processor, the circuit into a number of sub-circuits. The method can also include assigning, via the processor, the number of the sub-circuits to different processors for execution.

According to another embodiment described herein, a computer program product for execution of sequential secure computation code can include computer-readable storage medium having program code embodied therewith. The computer readable storage medium is not a transitory signal per se. The program code executable by a processor to cause the processor to obtain a circuit describing operations of sequential fully secure computation code. The program code can also cause the processor to modify the circuit based on a cost function. The program code can also cause the processor to partition the circuit into a plurality of sub-circuits. The program code can also cause the processor to assign the plurality of the sub-circuits to different processors for execution.

DETAILED DESCRIPTION

According to embodiments of the present disclosure, a system includes a processor that can obtain a circuit describing operations of sequential secure computation code. For example, the sequential secure computation code may be sequential fully homomorphic encryption (FHE) code. The processor can modify the circuit based on a cost function. The processor can partition the circuit into a number of sub-circuits. The processor can assign the number of the sub-circuits to different processors for execution. Thus, embodiments of the present disclosure allow sequential secure computation code to be executed concurrently on multiple processors and thus more efficiently. In addition, the embodiments enable circuit optimizations that improve the running time of the generated circuits. Moreover, the embodiments also enable migration of a solution from one language to another language using a standard description in the form of generated sub-circuits.

Figure 1:
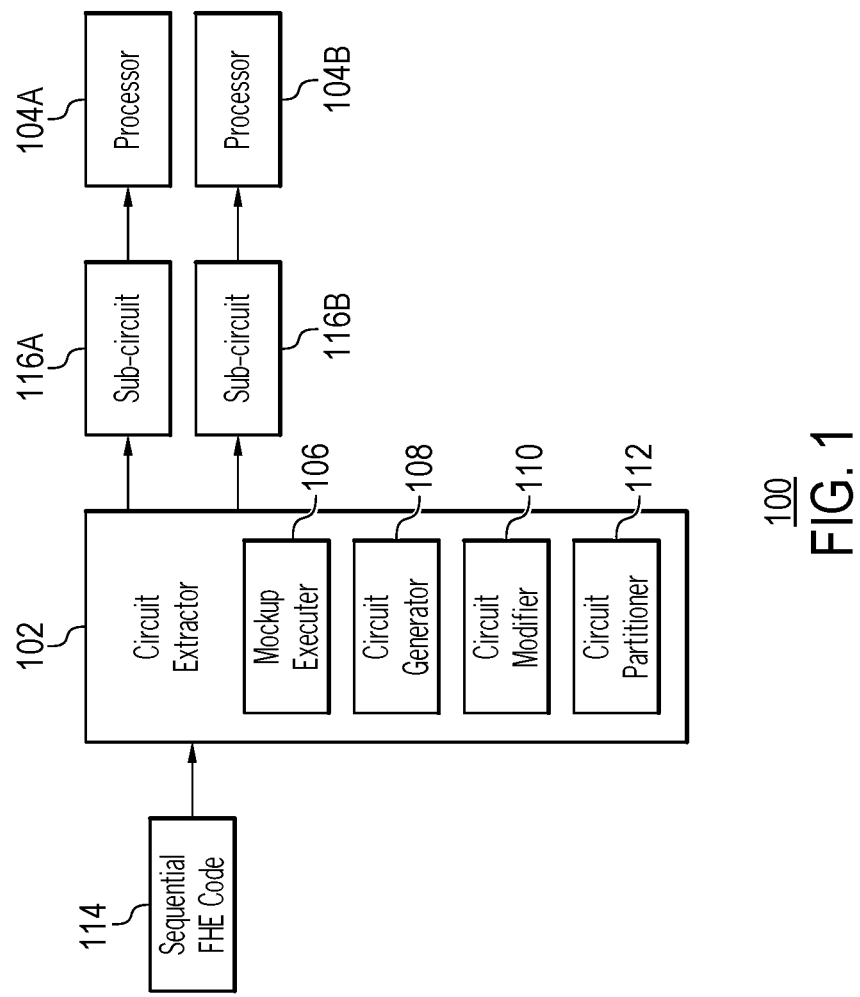
FIG. 1 is a block diagram of an example system for execution of secure computation code using generated sub-circuits.

With reference now to FIG. 1, a block diagram shows an example system for execution of secure computation code using generated sub-circuits. The example system is 100 of FIG. 1 includes a circuit extractor 102 communicatively coupled to two processors 104A and 104B. For example, the two processor 104A and 104B may be processors of different computing devices. As one example, the computing devices may be two servers connected via a network. The circuit extractor 102 includes a mockup executer 106, a circuit generator 108, a circuit modifier 110, and a circuit partitioner 112. The circuit extractor 102 is shown receiving sequential FHE code 114 and outputting sub-circuits 116A and 116B for execution by the processors 104A and 104B. For example, the sub-circuits 116A and 116B may be arithmetic circuits.

In the example of FIG. 1, the circuit extractor 102 of system 100 can automatically generate sub-circuits 116A and 116B for execution on multiple processors 104A and 104B in response to receiving a sequential FHE code 114. In particular, FHE code is agnostic to input data. Therefore, the mockup executer 106 may execute the sequential FHE code 114 using any suitable mockup ciphertext. For example, the mockup executer 106 can run the sequential FHE code 114 with a mockup class that keeps track of each operation performed in executing the sequential FHE code 114. In various examples, the mockup executer 106 can replace a secure computation library of the sequential FHE code 114 with a library that has the same interface. For example, the secure computation library for a homomorphic encryption code may be HElib first released 2013, Homomorphic Encryption for Arithmetic of Approximate Numbers (HEAAN) first released 2016, Simple Encrypted Arithmetic Library (SEAL) first released 2018, PALISADE first released 2017, Fast Fully Homomorphic Encryption over the Torus (TFHE) first released 2017, among other examples. The new replacement library may simulate the operation of the original library. Thus, the sequential FHE code 114 may not be changed before execution. In addition, for each operation the library performs, the new library may log the operation type and its inputs. The mockup executer 106 can thus run the sequential FHE code 114 with the replaced library to generate a log of all operations performed during a run. Because the sequential FHE code 114 may be oblivious to the input mockup ciphertext, the same operations may be performed on every input at each and every step.

In various examples, the circuit generator 108 may record operations performed during the execution of the mockup ciphertext. For example, the circuit generator 108 can collect the generated logs corresponding to the operations executed by the sequential FHE code 114 and format the logs as a description of a circuit. For example, the description may be in the format of a graph. In some examples, the graph may be a directed acyclic graph (DAG). For example, each node in the DAG may represent an operation, and each edge may represent the ciphertext that the nodes operate on. In various examples, each log entry from the generated logs may include a gate type, the input wire labels, and the output wire label.

In some examples, the circuit modifier 110 can apply optimizations to the generated circuit. For example, the circuit modifier 110 can modify the circuit structure. In various examples, the circuit modifier 110 can extract a polynomial describing the recorded circuit. For example, the polynomial may be a multivariate polynomial with every input being a variable to the polynomial. The circuit modifier 110 can then generate a second polynomial based on the number of processors to be used to execute the sequential FHE code 114 in parallel. The second polynomial may be used to generate a second optimized circuit.

Still referring to FIG. 1, once the circuit has been modified by the circuit modifier 110, the circuit partitioner 112 may decide which server executes each gate of the modified circuit. Thus, the circuit partitioner 112 may partition the circuit generated by the circuit generator 108 into a number of sub-circuits. Each of the sub-circuits may be executed by a different processor. In various examples, the circuit partitioner 112 may partition the circuit such that the number of crossing edges between the sub-circuits is minimized. For example, each crossing edge may indicate a piece of information to be sent from one sub-circuit to another sub-circuit. Such crossing edges may thus indicate data to be sent from one server to another server in the example where processors 104A and 104B are implemented in separate servers connected by a network. In addition, the circuit partitioner 112 may partition the circuit such that computational time is equally divided between the sub-circuits and can be performed in parallel. The circuit partitioner 112 can then generate a set of sub-circuits that can be used to calculate the same polynomial using a number of sub-circuits.

In some examples, the circuit partitioner 112 can use a gradient descent based algorithm to partition the circuit into sub-circuits. For example, the circuit partitioner 112 can start with a given partition where each gate is assigned to be executed on one of the servers. In various examples, the circuit partitioner 112 can then repeatedly apply a step in which the circuit partitioner 112 can look for a local change to the assignment of gates to servers. The algorithm may end when the circuit partitioner 112 cannot find a local change that improves the running time of the circuit. Because the circuit partitioner 112 can apply a change only if the change improves the running time of the circuit, the algorithm is guaranteed to terminate. In some examples, this algorithm may be formulated as a gradient descent algorithm. For example, the objective function may be a function f: $\{S\}^g \rightarrow R$, where S is the number of servers and g is the number of gates. A point in this space is a partition of g gates to S servers. In each iteration of the algorithm, the circuit partitioner 112 can take a step along the steepest gradient from a small subset of gradients we consider. For example, the gradient descent based algorithm may take the form:

---

Algorithm 1

1 Input: A circuit C with g gates, a number S > 1 of servers to run C on.
2 Output: A vector $p \in \{1, \ldots, S\}^g$ assigning each gate to a server.
3 := initial vector in $\{1, \ldots, S\}^g$
4 Descent step:
   // find best gradient
5 K := neighbors of p
6 k := $\text{argmin}_{k \in K}$Time(k) // If taking the next step has better times then take it
7 if Time(k) < Time(p) then
8 p := k
9 Go to Line 4
10 end

--- where the objective function Time: $\{1, \ldots, S\}^g \rightarrow R$ takes as input an assignment of g gates to one of S servers and outputs the time this assignment will take to compute. At Line 3, the algorithm starts from an initial starting point. In some examples, the initial starting point can be an assignment where all gates are assigned to a single server or a random assignment or any other assignment. In various examples, the initial assignment is set into a variable p, which holds, throughout the algorithm, the best assignment found so far. The algorithm executes the gradient-descent step in lines 4-9. In these lines, the algorithm tries to find an assignment that is better than p. If such as assignment is found, then the circuit partitioner 112 can replace p with the better assignment and the repeats another iteration of the gradient descent. In some examples, the circuit partitioner 112 can considers only a small subset of candidates from the entire space and typically these candidates are close to p (i.e. neighbors) by some metric. At line 5, the algorithms considers all the neighbors of p. In the context of assignments of g gates to S servers, that can be for examples all assignments that are different from p in n≥1 gates, where n is a parameter. For example, if n=6 the algorithm will consider all assignments that agree with p on g−6 gates. At line 6, the circuit partitioner 112 can compute the time to compute the circuit for each assignment in the subset K and set k to be the assignment with the minimal time. Then, if k has better times than p, the circuit partitioner 112 can change p to be k at line 8, and repeat the gradient descent at lines 4-9.

In some examples, the circuit partitioner 112 can use a constrained optimization to partition the variables $x_1, \ldots, x_n$ between servers to optimize some performance measure P. For example, the circuit partitioner 112 may partition the circuit generated by the circuit generator 108 into a number of sub-circuits using a constrained optimization calculation. For example, the system 100 may contain N servers, including two servers separately executing on processors 104A and 104B, and is to complete O operations in a minimum time. Each operation may have a set preceding operation $P_o$ and a set immediately preceding operation $IP_o$. In addition, the system 100 may have a set of terminal operations TO. Each operation may have a known processing time, dependent on task and operation, but independent of any server. In various examples, the circuit partitioner 112 can decide which operations are to be performed on which server, and in what order with an optimization goal to minimize the total processing time. For example, a constrained optimization could be formulated as the following MILP problem:

$$\min \quad \text{makespan}$$

$$\text{s.t.} \quad ct_{o2} \geq ct_{o1} + pt_{o2} + \text{commTime} * (o2s_{o1,n} - o2s_{o2,n}) \forall n, o2, o1 \in IP_{o2}$$

$$\text{makespan} \geq ct_o \forall o \in TO$$

$$ct_{o2} \geq ct_{o1} + pt_{o2} - W(3 - o2s_{o1,n} - o2s_{o2,n} - x_{o1,o2}) \forall n, o2, o1 \notin P_{o2}$$

$$x_{o1,o2} = 1 \forall o2, o1 \in P_{o2}$$

$$x_{o1,o2} + x_{o2,o1} \leq 1 \forall o1 \neq o2$$

$$x_{o1,o2} + x_{o2,o1} \geq 1 - (2 - o2s_{o1,n} - o2s_{o2,n}) \forall n, o2, o1 \notin P_{o2}$$

$$\sum_{n=1}^{N} o2s_{o,n} = 1 \forall o$$

$$x_{o1,o2}, o2s_{o,n} \in \{0, 1\}; ct_o, \text{makespan} \geq 0$$

where the parameters include $pt_o$, which is the processing time for operation o, commTime, representing communication time between servers, and W, which is a large number. The variables include $o2s_{o,n}$, which is a decision to perform operation o on server n, $x_{o1,o2}$, representing a decision to perform operation o1 before operation o2, $ct_o$, representing the completion time of operation o, and makespan, representing the maximum completion time for all tasks. In various examples, any number of example constraint sets may be included to constrain the optimization. For example, in a first example constraint set, if the operation o2 comes immediately after the operation o1, then the completion time of operation o2 may be equal to or greater than the completion time of the operation o1 plus processing time of the operation o2 plus communication time if operations performed on the different servers. In a second example constraint set, a maximum completion time may be greater or equal then completion time of all terminal operations. For example, terminal operations may be operations that have no successors. In a third example constraint set, if operations o1 and o2 have no predefined precedence order, both operations are to be performed on the same server, and operation o1 should be performed before operation o2, then the completion time of operation o1 should be greater than completion time of the operation o1 plus processing time of the operation o2. In a fourth constraint set, if operation o1 precede operation o2, then corresponding decision variable set to 1. In a fifth example constraint set, a maximum one precedence is allowed either o1 before o2 or o2 before o1. In a sixth example constraint, if there is no predefined precedence order between o1 and o2, and both o1 and o2 are to be running on the same server, then the order may be defined to be either o1 before o2 or o2 before o1. Finally, in an example seventh constraint set, each operation is to be performed on some server.

As one example, the input sequential FHE code 114 to the system 100 may be code written by a developer in any suitable higher language, such as C++. For example, the code to compute the product of a, b, c, and d may be received in the form:

ab=mul(a, b)
cd=mul(c, d)
x=mul(ab, cd)

where the first line of the code computes the product of a and b and stores it in the variable ab, the second line the code computes the product of c and d and stores it in the variable cd, and the third line of code computes the product of ab and Eq. 1 cd to get the product of a, b, d and d. In this example, the output of the circuit generator 108 may be a description of an arithmetic circuit. For example, the output of the circuit generator 108 may be: [Multiplication gate with inputs 'a' and 'b', and an output called 'ab'], [Multiplication gate with inputs 'c' and 'd', and an output called 'cd'], [Multiplication gate with inputs 'ab' and 'cd', and an output called 'x']. The output of the circuit extractor 102 may be first sub-circuit [Multiplication gate with inputs 'a' and 'b', and an output called 'ab'] 116A and a second sub-circuit [Multiplication gate with inputs 'c' and 'd', and an output called 'cd'], [Multiplication gate with inputs 'ab' and 'cd', and an output called 'x'] 116B. The first sub-circuit 116 may be executed by the first processor 104A in parallel with sub-circuit 116B being executed by the second processor 104B.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.). For example, the mockup executer 106 and circuit generator 108 may be excluded in examples where a circuit describing the sequential FHE code 114 is available and provided directly to the circuit partitioner 112. In various examples, the sequential FHE code 114 may be any other sequential secure computation code. For example, the secure computation code may be other forms of homomorphic encryption, MPC with Beaver Triples, garbled circuits, or any other suitable secure computation code. Furthermore, in some examples, the circuit modifier 110 and the circuit partitioner 112 may be implemented as one module.

Figure 2A:
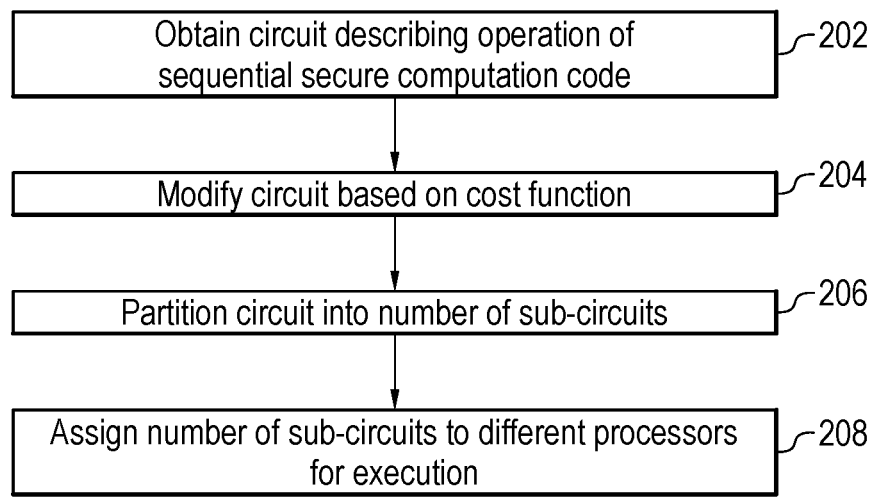
FIG. 2A is a block diagram of an example method that can generate sub-circuits for execution of secure computation code based on an obtained circuit describing the secure computation code.

FIG. 2A is a process flow diagram of an example method that can generate sub-circuits for execution of secure computation code. The method 200A can be implemented with any suitable computing device, such as the computing device 300 of FIG. 3 and is described with reference to the system 100 of FIG. 1. For example, the methods described below can be implemented by the processor 302 or the processor 602 of FIGS. 3 and 6, respectively.

At block 202, a processor obtains a circuit describing operations of sequential secure computation code. For example, the sequential secure computation code may be sequential fully homomorphic encryption (FHE) code.

At block 204, the processor modifies the circuit. For example, the circuit may be modified to optimize latency or throughput when executed on a number of processors on different machines coupled via a network. In various examples, the processor can extract an underlying polynomial of the circuit, generate a second polynomial that minimizes a cost function, and generate a modified circuit based on the second polynomial.

At block 206, the processor partitions the circuit into a number of sub-circuits. For example, the processor may generate a polynomial describing the circuit and split the polynomial into a number of polynomials that do not share variables. In various examples, partitioning the circuit is based on reducing a difference in computation time between the sub-circuits and reducing data to be sent between the sub-circuits. In some examples, the processor partitions the circuit into a number of sub-circuits using a gradient descent based algorithm. For example, the processor can partition the circuit using Algorithm 1. In some examples, the processor partitions the circuit into a number of sub-circuits using a constraint optimization. For example, the processor can partition the circuit using Eq. 3.

At block 208, the processor assigns the number of the sub-circuits to different processors for execution. For example, each of the sub-circuits may be assigned to a different processor. In various examples, the processors may be in different computing devices that are coupled via a network connection. In various examples, the processors may then execute the sub-circuits. In this manner, execution of the sequential secure computation code is parallelized over multiple processors or computing devices.

The process flow diagram of FIG. 2A is not intended to indicate that the operations of the method 200A are to be executed in any particular order, or that all of the operations of the method 200A are to be included in every case. Additionally, the method 200A can include any suitable number of additional operations. For example, the method 200A may include converting the circuit into a different code associated with a different library to test for performance improvements.

Figure 2B:
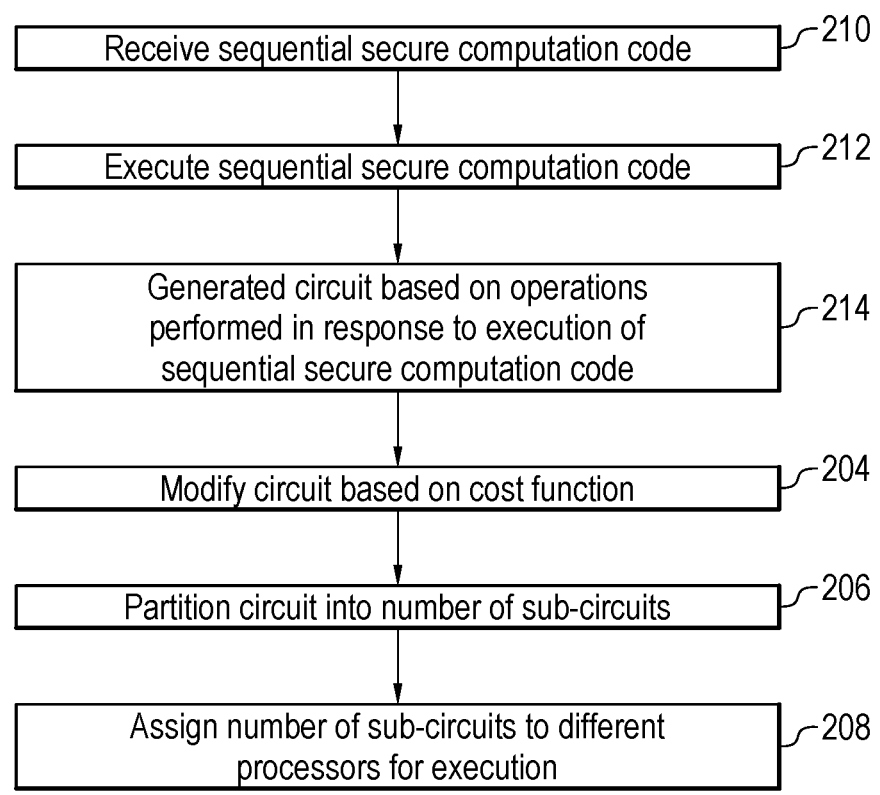
FIG. 2B is a block diagram of an example method that can generate sub-circuits for execution of secure computation code based on a received secure computation code.

FIG. 2B is a process flow diagram of an example method that can generate sub-circuits for execution of secure computation code. The method 200B can be implemented with any suitable computing device, such as the computing device 300 of FIG. 3 and is described with reference to the system 100 of FIG. 1. For example, the methods described below can be implemented by the processor 302 or the processor 602 of FIGS. 3 and 6, respectively. FIG. 2B includes similarly referenced blocks of FIG. 2A.

At block 210, a processor receives a sequential secure computation code. For example, the sequential secure computation code may be a sequential fully homomorphic encryption (FHE) code.

At block 212, the processor executes the sequential secure computation code. For example, the sequential secure computation code may be executed with a mockup ciphertext as input. In various examples, the processor can execute the secure computation code using a replacement library that logs operations performed during execution.

At block 214, the processor generates the circuit based on logged operations performed in response to execution of the sequential secure computation code. For example, the logged operations may be formatted in the form of a graph. In some examples, the graph may be a directed acyclic graph (DAC). In various example, the generated circuit may be an arithmetic circuit.

At blocks 204, 206, and 208, the processor executes the similarly referenced blocks described in FIG. 2A. For example, at block 204, the processor modifies the circuit. At block 206, the processor partitions the circuit into a number of sub-circuits. At block 208, the processor assigns the number of the sub-circuits to different processors for execution.

The process flow diagram of FIG. 2B is not intended to indicate that the operations of the method 200B are to be executed in any particular order, or that all of the operations of the method 200B are to be included in every case. Additionally, the method 200B can include any suitable number of additional operations. For example, the method 200A may include converting the circuit into a different code associated with a different library to test for performance improvements.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
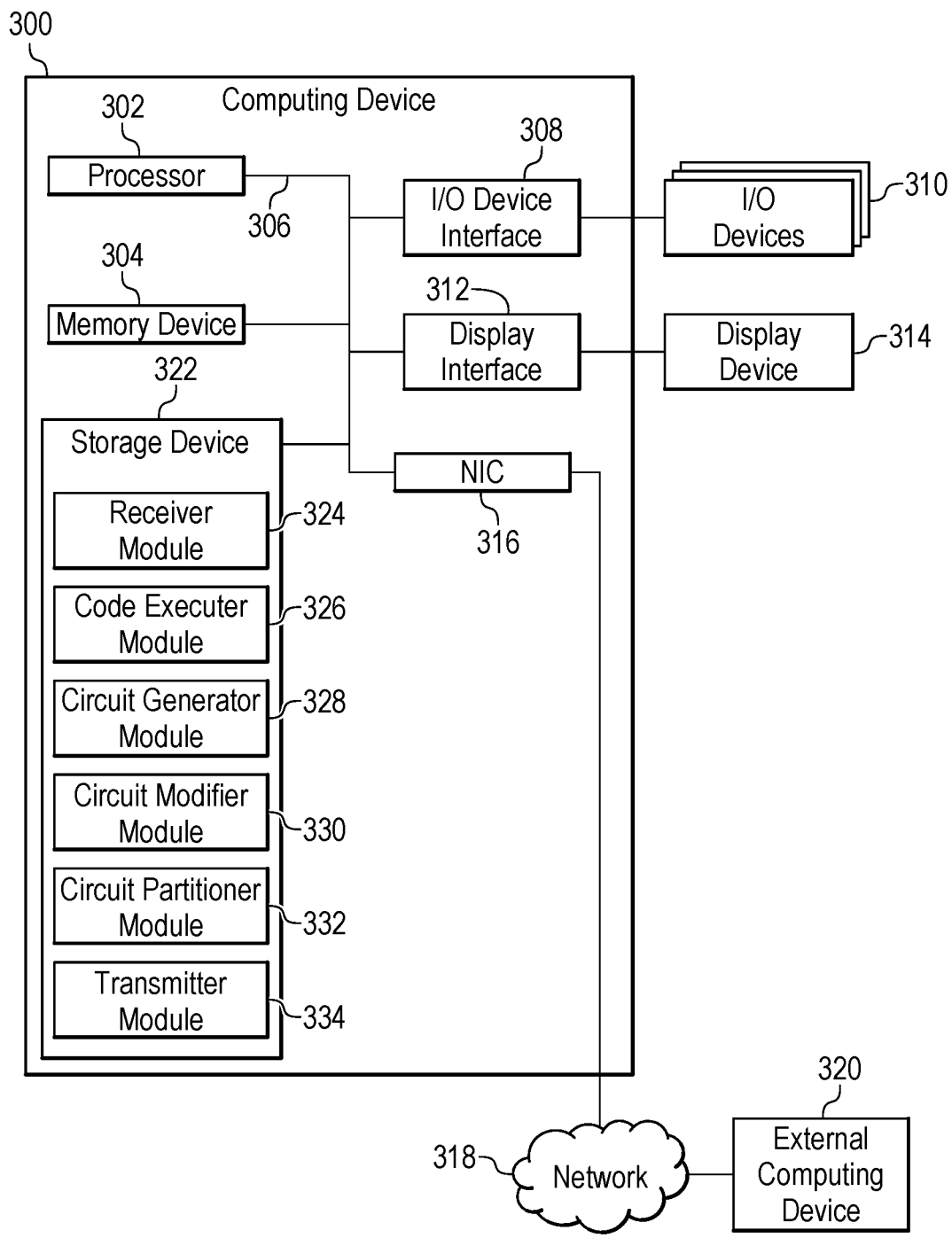
FIG. 3 is a block diagram of an example computing device that can generate sub-circuits for execution of secure computation code.

FIG. 3 is block diagram of an example computing device that can generate sub-circuits for execution of secure computation code. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver module 324, a code executer module 326, a circuit generator module 328, a circuit modifier module 330, a circuit partitioner module 332, and a transmitter module 334. The receiver module 324 can receive a sequential secure computation code. For example, the sequential secure computation code may be sequential FHE code. The code executer module 326 can execute the sequential secure computation code using a replaced library that logs an operation type and inputs for each operation. The circuit generator module 328 can obtain a circuit describing operations of the sequential secure computation code. For example, the circuit may be an arithmetic circuit. In various examples, the circuit is convertible into a second code that is different from the secure computation code. The circuit generator module 328 can generate the circuit based on operations performed in response to execution of the sequential secure computation code. The circuit modifier module 330 can modify the circuit based on a cost function. In various examples, the circuit modifier module 330 can extract an underlying polynomial of the circuit, generate a second polynomial that minimizes a cost function, and generate a modified circuit based on the second polynomial. In some examples, the circuit modifier module 330 can modify the circuit iteratively. For example, for higher dimensions, the circuit modifier module 330 can repeatedly run Newton's method, also known as Newton Raphson's method, until a polynomial of the form (x-a)(x-b)(x-c) . . . (x-n) is determined. The circuit partitioner module 332 can partition the circuit into a number of sub-circuits. For example, the circuit partitioner module 332 can randomly assign each node to a server. The circuit partitioner module 332 can then parse through all pairs of nodes and switch their assigned server. If the switching does not improve the cost function, then the circuit partitioner module 332 can revert this change. In various examples, the circuit partitioner module 332 can consider all pairs in this manner and switch them repeated until there are no pairs to switch. In some examples, the circuit partitioner module 332 can partition the circuit using a gradient descent based algorithm. For example, the circuit partitioner module 332 can partition the circuit using Algorithm 1 described above. In some examples, the circuit partitioner module 332 can partition the circuit using a constrained optimization. For example, the circuit partitioner module 332 can solve partitioning as a problem of constraint optimization using Eq. 1 above and any combination of various constraints described herein, among others. The circuit partitioner module 332 can receive various constraints, such as gate X is an input of gate Y (formulated properly) or gate X takes time to compute and ciphertext C takes time to be transmitted. The circuit partitioner module 332 can then minimize an objective function. For example, the objective function may be to have the completion time of the last gate as small as possible. The transmitter module 334 can assign the number of the sub-circuits to different processors for execution. The transmitter module 334 can then transmit the number of the sub-circuits to different processors for execution.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). For example, the computing device 300 may further include a code conversion module (not shown) to convert the circuit into a different code associated with a different library to test for performance improvements. Furthermore, any of the functionalities of the receiver module 324, the code executer module 326, the circuit generator module 328, the circuit modifier module 330, the circuit partitioner module 332, and the transmitter module 334, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver module 324, the code executer module 326, the circuit generator module 328, the circuit modifier module 330, the circuit partitioner module 332, and the transmitter module 334 can be implemented with logic, wherein the logic, as referred to herein, can include any suitable hardware (e.g., a processor, among others), software (e.g., an application, among others), firmware, or any suitable combination of hardware, software, and firmware.

Figure 4:
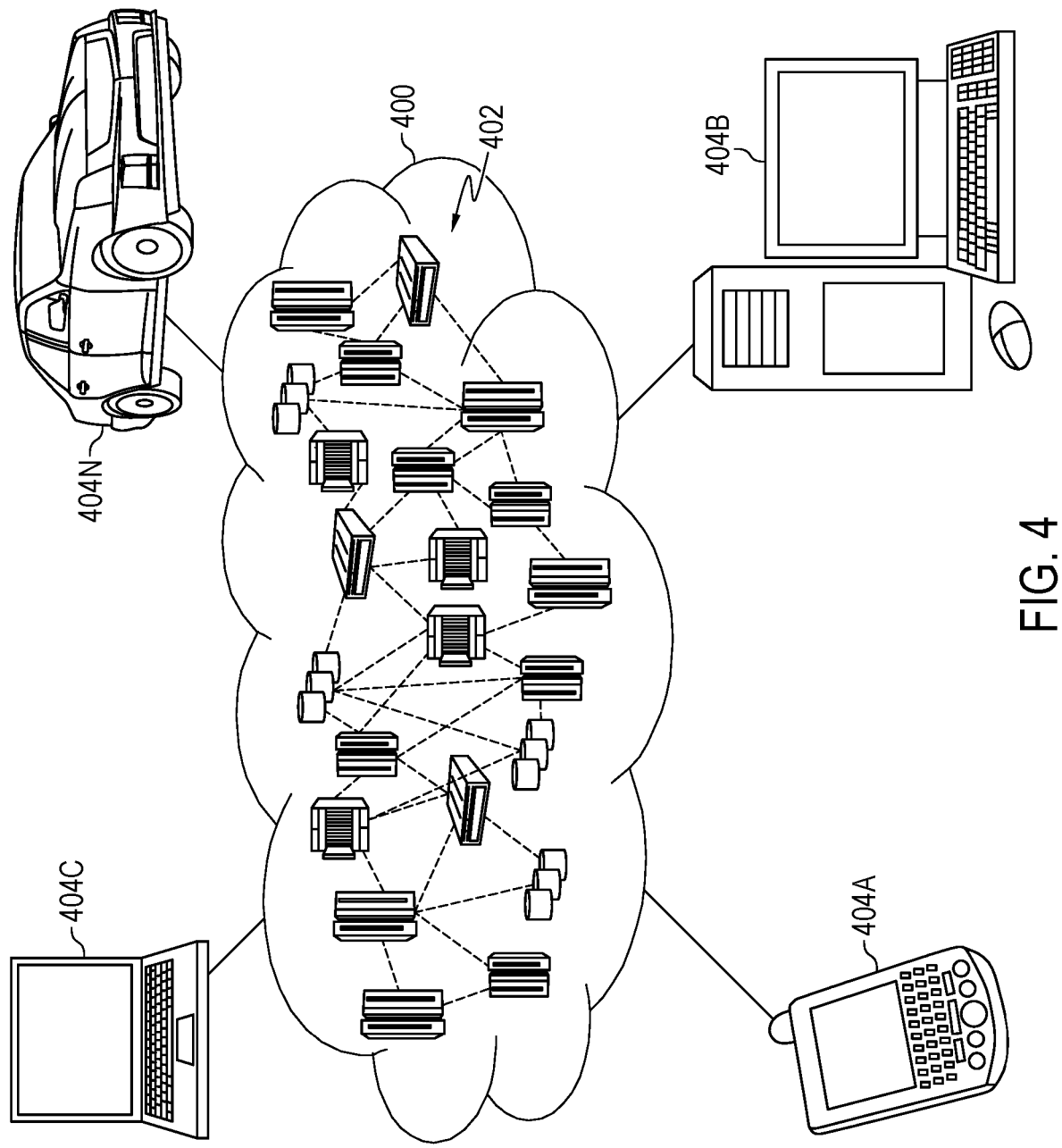
FIG. 4 is a diagram of an example cloud computing environment according to embodiments described herein.

Referring now to FIG. 4, illustrative cloud computing environment 400 is depicted. As shown, cloud computing environment 400 includes one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
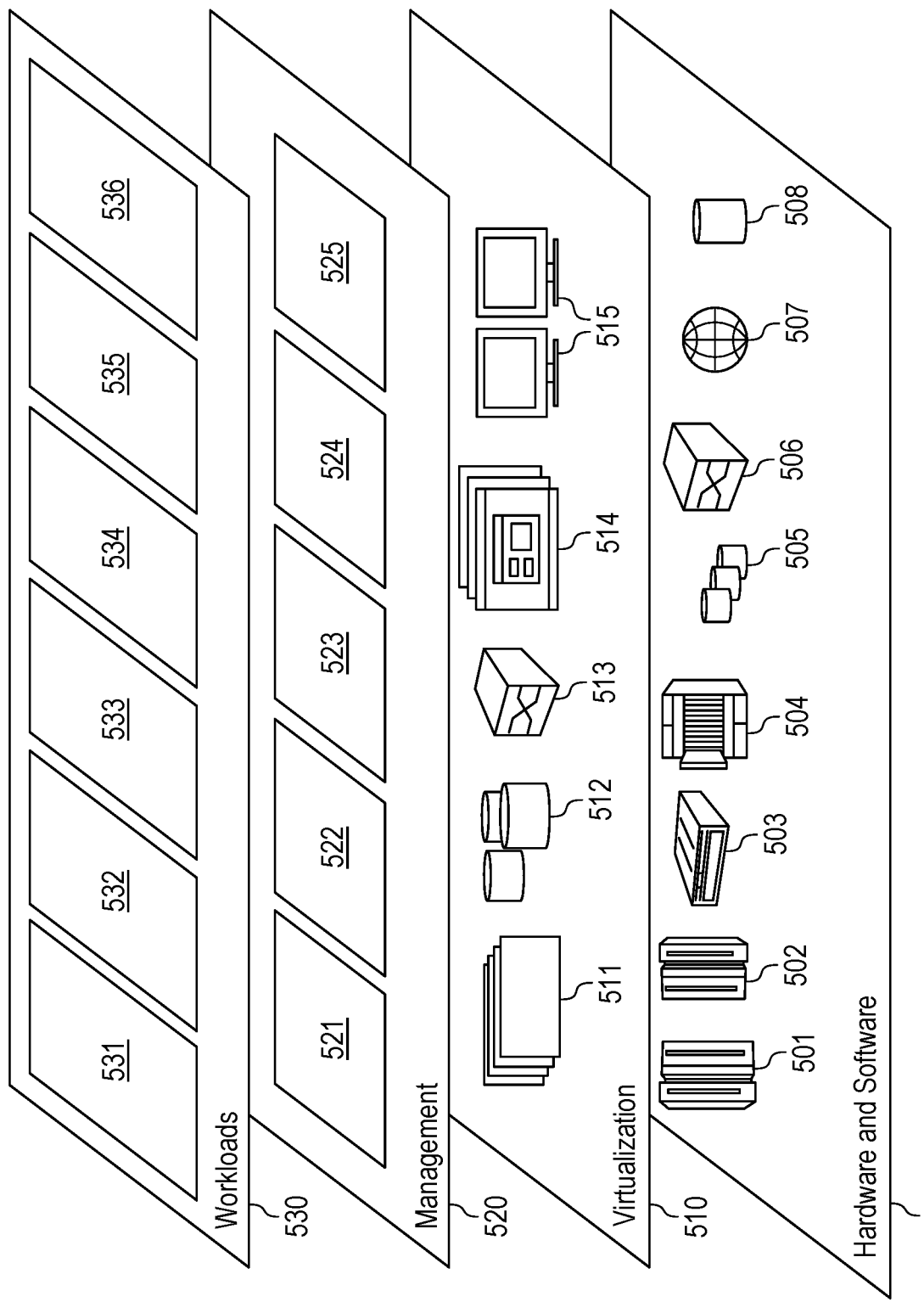
FIG. 5 is a diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: mainframes 501; RISC (Reduced Instruction Set Computer) architecture based servers 502; servers 503; blade servers 504; storage devices 505; and networks and networking components 506. In some embodiments, software components include network application server software 507 and database software 508.

Virtualization layer 510 provides an abstraction layer from which the following examples of virtual entities may be provided: virtual servers 511; virtual storage 512; virtual networks 513, including virtual private networks; virtual applications and operating systems 514; and virtual clients 515.

In one example, management layer 520 may provide the functions described below. Resource provisioning 521 provides dynamic procurement of computing resources and other resources that are utilized to perform tasks within the cloud computing environment. Metering and Pricing 522 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 523 provides access to the cloud computing environment for consumers and system administrators. Service level management 524 provides cloud computing resource allocation and management such that required service levels are met. Service Level Agreement (SLA) planning and fulfillment 525 provide pre-arrangement for, and procurement of, cloud computing resources for which a future requirement is anticipated in accordance with an SLA.

Workloads layer 530 provides examples of functionality for which the cloud computing environment may be utilized. Examples of workloads and functions which may be provided from this layer include: mapping and navigation 531; software development and lifecycle management 532; virtual classroom education delivery 533; data analytics processing 534; transaction processing 535; and secure computation code processing 536.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
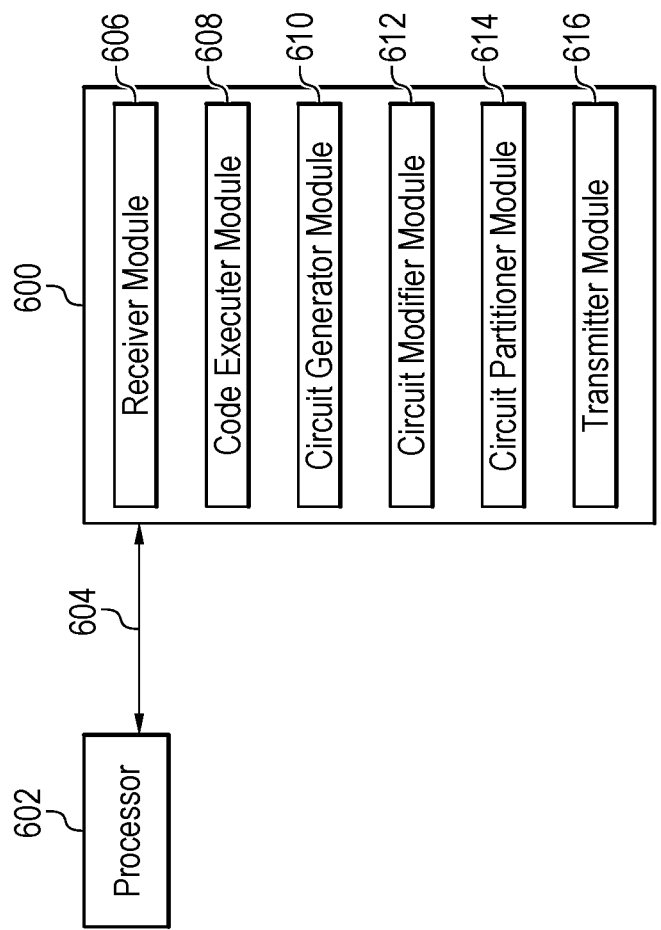
FIG. 6 is an example tangible, non-transitory computer-readable medium that can generate sub-circuits for execution of secure computation code.

Referring now to FIG. 6, a block diagram is depicted of an example tangible, non-transitory computer-readable medium 600 that can generate sub-circuits for execution of secure computation code. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the methods 200A or 200B of FIGS. 2A and 2B.

The various software components discussed herein may be stored on the tangible, non-transitory, computer-readable medium 600, as indicated in FIG. 6. For example, a receiver module 606 includes code to receive sequential secure computation code. In some examples, the sequential secure computation code may be sequential FHE code. A code executer module 608 includes code to execute the sequential secure computation code. The code executer module 608 further includes code to execute the secure computation code using a replacement library that logs operations performed during execution. A circuit generator module 610 includes code to obtain a circuit describing operations of the sequential secure computation code. The circuit generator module 610 also includes code to generate the circuit based on logged operations performed in response to execution of the sequential secure computation code. In various examples, the circuit generator module 610 includes code to format the logged operations as a graph. A circuit modifier module 612 includes code to modify the circuit based on a cost function. In various examples, the circuit modifier module 612 includes code to extract an underlying polynomial of the circuit, generate a second polynomial that minimizes a cost function, and generate a modified circuit based on the second polynomial. A circuit partitioner module 614 includes code to partition the circuit into a number of sub-circuits. A transmitter module 616 includes code to assign the number of the sub-circuits to different processors for execution. The transmitter module 616 may then transmit the number of the sub-circuits to different processors for execution.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application. For example, the computer-readable medium 600 may also include a code conversion module (not shown) to convert the circuit into a different code associated with a different library to test for performance improvements.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive sequential secure computation code;
execute the sequential secure computation code using a replaced library that logs an operation type and inputs for each of a plurality of logged operations;
generate a circuit based on the logged operations performed in response to execution of the sequential secure computation code;
modify the circuit based on a cost function;
partition the modified circuit into a plurality of sub-circuits such that data to be sent between the sub-circuits is reduced; and
assign the plurality of the sub-circuits to different processors for execution.

2. The system of claim 1, wherein the processor is to extract an underlying polynomial of the circuit, generate a second polynomial that minimizes the cost function, and generate the modified circuit based on the second polynomial.

3. The system of claim 1, wherein the processor is to modify the circuit iteratively.

4. The system of claim 1, wherein the processor is to partition the circuit using a gradient descent based algorithm.

5. The system of claim 1, wherein the processor is to partition the circuit using a constrained optimization.

6. The system of claim 1, wherein the modified circuit is convertible into a second code that is different from the sequential secure computation code.

7. The system of claim 1, wherein to partition the modified circuit into the plurality of sub-circuits, the processor is to generate a polynomial describing the circuit and split the polynomial into a number of polynomials that do not share variables.

8. A computer-implemented method, comprising:
receiving, via a processor, sequential secure computation code;
executing, via the processor, the sequential secure computation code using a replaced library that logs an operation type and inputs for each of a plurality of logged operations;
generating, via the processor, a circuit based on the logged operations performed in response to execution of the sequential secure computation code;
modifying, via the processor, the circuit based on a cost function;
partitioning, via the processor, the modified circuit into a plurality of sub-circuits comprising partial circuits such that data to be sent between the sub-circuits is reduced; and
assigning, via the processor, the plurality of the sub-circuits to different processors for execution.

9. The computer-implemented method of claim 8, wherein executing the sequential secure computation code comprises executing the sequential secure computation code using a replacement library that logs operations performed during execution.

10. The computer-implemented method of claim 8, wherein generating the modified circuit comprises formatting the logged operations as a graph.

11. The computer-implemented method of claim 8, wherein modifying the circuit comprises extracting an underlying polynomial of the circuit, generating a second polynomial that minimizes the cost function, and generating the modified circuit based on the second polynomial.

12. The computer-implemented method of claim 8, further comprising converting, via the processor, the modified circuit into a different code associated with a different library to test for performance improvements.

13. The computer-implemented method of claim 8, wherein partitioning the modified circuit into the plurality of sub-circuits comprises generating a polynomial describing the circuit and splitting the polynomial into a number of polynomials that do not share variables.

14. A computer program product for execution of sequential secure computation code, the computer program product comprising a computer-readable storage medium having program code embodied therewith, the program code executable by a processor to cause the processor to:

receive sequential secure computation code;

execute the sequential secure computation code using a replaced library that logs an operation type and inputs for each of a plurality of logged operations;

generate a circuit based on the logged operations performed in response to execution of the sequential secure computation code;

modify the circuit based on a cost function;

partition the modified circuit into a plurality of sub-circuits such that data to be sent between the sub-circuits is reduced; and assign the plurality of the sub-circuits to different processors for execution.

15. The computer program product of claim 5, further comprising program code executable by the processor to execute the sequential secure computation code using a replacement library that logs operations performed during execution.

16. The computer program product of claim 15, further comprising program code executable by the processor to format the logged operations as a graph.

17. The computer program product of claim 14, further comprising program code executable by the processor to extract an underlying polynomial of the circuit, generate a second polynomial that minimizes the cost function, and generate the modified circuit based on the second polynomial.

18. The computer program product of claim 14, further comprising program code executable by the processor to convert the modified circuit into a different code associated with a different library to test for performance improvements.

19. The computer program product of claim 14, further comprising program code executable by a processor to cause the processor to generate a polynomial describing the circuit and split the polynomial into a number of polynomials that do not share variables to partition the circuit into the plurality of sub-circuits.

* * * * *